United States Patent
Garrity

(10) Patent No.: US 8,934,269 B2
(45) Date of Patent: *Jan. 13, 2015

(54) SOLAR PHOTOVOLTAIC POWER CONDITIONING UNITS

(71) Applicant: Enecsys Limited, Cambridge (GB)

(72) Inventor: Paul Garrity, Rockwall, TX (US)

(73) Assignee: Enecsys Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,257

(22) Filed: Feb. 15, 2013

(65) Prior Publication Data

US 2013/0229842 A1 Sep. 5, 2013

Related U.S. Application Data

(63) Continuation of application No. 13/244,161, filed on Sep. 23, 2011, now Pat. No. 8,391,031.

(30) Foreign Application Priority Data

Mar. 22, 2011 (GB) .................................. 1104800.6

(51) Int. Cl.
*H02M 5/44* (2006.01)
*H02M 7/48* (2006.01)
(Continued)

(52) U.S. Cl.
CPC .............. *H02M 7/44* (2013.01); *H02M 7/4807* (2013.01); *H02J 3/383* (2013.01); *Y02E 10/563* (2013.01)
USPC .................... 363/37; 363/35; 363/40; 363/65; 363/67

(58) Field of Classification Search
USPC ........... 363/34, 35, 36, 37, 40, 44, 65, 67, 68, 363/69, 70, 71
See application file for complete search history.

(56) References Cited

U.S. PATENT DOCUMENTS 4,183,079 A 1/1980 Wachi
4,488,136 A 12/1984 Hansen et al.
(Continued)

FOREIGN PATENT DOCUMENTS

EP 0340006 11/1989
GB 2419968 5/2006
(Continued)

OTHER PUBLICATIONS

Portions of prosecution history of U.S. Appl. No. 13/244,161, Feb. 1, 2013, Garrity, Paul.
(Continued)

*Primary Examiner* — Nguyen Tran
(74) *Attorney, Agent, or Firm* — Adeli LLP

(57) ABSTRACT

We describe a photovoltaic power conditioning unit comprising: both dc and ac power inputs; a dc link; at least one dc-to-dc converter coupled between dc input and dc link; and a dc-to-ac converter coupled between dc link and ac output. The dc-to-dc converter comprises: a transformer having input and output windings; an input dc-to-ac converter coupled between dc input and input winding; and an ac-to-dc converter coupled between output winding the dc link. The output winding has a winding tap between the first and second portions. The ac-to-dc converter comprises: first and second rectifiers, each connected to a respective first and second portion of the output winding, to the dc link and winding tap; and a series inductor connected to the winding tap. Rectifiers are connected to the winding tap of the output winding via the series inductor wherein the series inductor is shared between the first and second rectifiers.

9 Claims, 15 Drawing Sheets

(51) Int. Cl.
*H02M 7/44* (2006.01)
*H02J 3/38* (2006.01)

(56) References Cited

U.S. PATENT DOCUMENTS

| | | | |
|---|---|---|---|
| 4,772,994 | A | 9/1988 | Harada et al. |
| 5,404,059 | A | 4/1995 | Löffler |
| 5,576,941 | A | 11/1996 | Nguyen et al. |
| 5,636,107 | A | 6/1997 | Lu et al. |
| 5,726,615 | A | 3/1998 | Bloom |
| 5,946,206 | A | 8/1999 | Shimizu et al. |
| 5,982,645 | A | 11/1999 | Levran et al. |
| 6,211,657 | B1 | 4/2001 | Goluszek |
| 6,445,599 | B1 | 9/2002 | Nguyen |
| 6,807,069 | B2 | 10/2004 | Nieminen et al. |
| 6,888,728 | B2 | 5/2005 | Takagi et al. |
| 7,471,524 | B1 | 12/2008 | Batarseh et al. |
| 7,728,708 | B2 | 6/2010 | Fushimi et al. |
| 8,369,113 | B2 | 2/2013 | Rodriguez |
| 8,391,031 | B2 | 3/2013 | Garrity |
| 8,410,889 | B2 | 4/2013 | Garrity et al. |
| 2003/0185026 | A1 | 10/2003 | Matsuda et al. |
| 2004/0076028 | A1 | 4/2004 | Achleitner et al. |
| 2004/0145928 | A1* | 7/2004 | Takada ............... 363/95 |
| 2004/0189432 | A1 | 9/2004 | Yan et al. |
| 2004/0233685 | A1 | 11/2004 | Matsuo et al. |
| 2007/0133241 | A1 | 6/2007 | Mumtaz et al. |
| 2007/0164612 | A1 | 7/2007 | Wendt et al. |
| 2007/0217239 | A1 | 9/2007 | Rottger et al. |
| 2007/0290656 | A1 | 12/2007 | Lee Tai Keung |
| 2011/0051468 | A1 | 3/2011 | Kyono |
| 2012/0081937 | A1 | 4/2012 | Phadke |

FOREIGN PATENT DOCUMENTS

| | | |
|---|---|---|
| GB | 2486509 | 1/2013 |
| GB | 2491494 | 5/2013 |
| JP | 2003/289674 | 10/2003 |
| WO | WO 82/02134 | 6/1982 |
| WO | WO 02/078164 | 10/2002 |
| WO | WO 2006/089778 | 8/2006 |
| WO | WO 2007/080429 | 7/2007 |
| WO | WO 2010/119324 | 10/2010 |
| WO | WO 2012/127208 | 9/2012 |

OTHER PUBLICATIONS

Portions of prosecution history of GB 1104800, mailing date Dec. 11, 2012, Enecsys Limited.
Portions of prosecution history of GB 1211883, mailing date Apr. 9, 2013, Enecsys Limited.
International Search Report and Written Opinion of PCT/GB2012/050515, mailing date Dec. 14, 2012, Enecsys Limited.
International Preliminary Report on Patentability of PCT/GB2012/050515, mailing date Oct. 3, 2013, Enecsys Limited.
Mumtaz, Asim, et al., "Grid Connected PV Inverter using a Commercially Available Power IC," PV in Europe Conference, Oct. 2002, Rome, Italy.

* cited by examiner

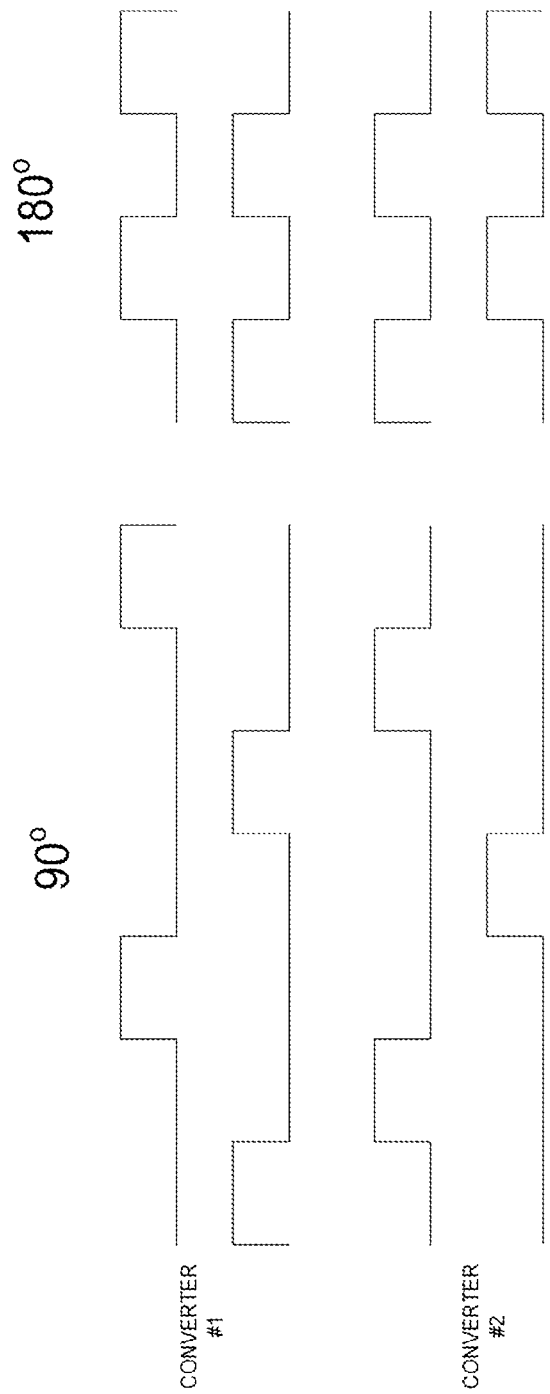

SOLAR PHOTOVOLTAIC POWER CONDITIONING UNITS

CLAIM OF BENEFIT TO PRIOR APPLICATIONS

This application is a continuation application of U.S. patent application Ser. No. 13/244,161, filed Sep. 23, 2011, now published as U.S. Publication 2012/0063177. U.S. patent application Ser. No. 13/244,161 claims benefit of an earlier-filed United Kingdom Patent Application 1104800.6, filed Mar. 22, 2011. U.S. patent application Ser. No. 13/244, 161, now published as U.S. Publication 2012/0063177 and United Kingdom Patent Application 1104800.6 are incorporated herein by reference.

FIELD OF THE INVENTION

This invention relates to power conditioning units for delivering power from a dc source to an ac output, either for connecting directly to the mains (grid) utility supply or for powering mains (grid) devices directly, independent from the mains utility supply. The techniques we describe are particularly suitable for power conditioning units for photovoltaic (PV) modules.

BACKGROUND TO THE INVENTION

We have previously described a range of improved techniques for increasing reliability and efficiency in photovoltaic power conditioning units (inverters), for example in WO2007/080429 and in many other of our published patent applications.

We now describe some further techniques for increasing the efficiency of harvesting power from a PV panel, in particular at low levels of power output. These in turn facilitate harvesting of solar energy early and late in the day and in overcast conditions, thus increasing the overall energy yield

SUMMARY OF THE INVENTION

According to the present invention there is therefore provided a power conditioning unit for delivering power from a dc power source to an ac mains power supply output, the power conditioning unit comprising: a dc power input to receive dc power from a dc power source; an ac power output for delivering ac power to said ac mains power supply; a dc link coupled between said dc power input and said ac power output; at least a first dc-to-dc converter coupled between said dc power input and said dc link; and a dc-to-ac converter coupled between said dc link and said ac power output; wherein said dc-to-dc converter comprises: a transformer having an input winding and an output winding; an input dc-to-ac converter coupled between said dc power input and said input winding of said transformer; an ac-to-dc converter coupled between said output winding of said transformer and said dc link; and wherein said output winding of said transformer has a winding tap between first and second portions of said output winding, and wherein said ac-to-dc converter comprises: first and second rectifiers, each connected to a respective first and second said portion of said output winding, to said dc link, and to said winding tap; and a series inductor connected to said winding tap; and wherein said rectifiers are each connected to said winding tap of said output winding via said series inductor such that said series inductor is shared between said first and second rectifiers.

Broadly speaking in embodiments by arranging for a shared inductor, component tolerances can be more closely controlled, thus reducing the need to oversize portions of the circuitry to take account of component value variations. Moreover, in embodiments the shared series inductor facilitates the use of two or more dc-to-dc converters on the input side of the power conditioning unit by, in effect, forcing current sharing between these converters (by limiting dips in the current from each), which provides further efficiencies described later.

In some preferred embodiments the shared inductor comprises a winding on a core of the transformer, which provides further advantages both by reducing losses and also because the inductance is effectively reflected back to primary side of the transformer so that errors in the resonant frequency of the dc-to-ac converter, again due to component tolerances (of the primary side inductance) are effectively swamped and dominated by the output side shared inductor. This again facilitates accurate control of the operation of the inverter, hence further increasing efficiency. More particularly, the output side inductance is reflected back, in proportion to the square of the primary:secondary terms ratio and appears in series with the primary side inductance, the combined inductance defining the resonant frequency of operation (which is generally fixed by design). Thus embodiments of the techniques we describe facilitate accurate setting of this resonant frequency, and hence efficient operation.

In one preferred implementation the inductor is built into the transformer by winding the inductor on a portion of the core of the transformer which shares a magnetic circuit with both the first and second portions of the output winding. More particularly the transformer may have three legs, one bearing a first portion of the output winding, a second bearing a second portion of the output winding, and a third, for example central, leg bearing the winding of the shared inductor. In embodiments a portion of this shared inductor winding is also wound around each of the first and second legs in an opposite sense to that of the output windings of the transformer, to cancel the respective portions of the output winding flux.

In some particularly preferred embodiments the power conditioning unit includes a pair (or more) of the dc-to-dc converters operating in parallel between the dc power input and the dc link. Providing two such converters reduces the $I^2R$ losses in the power conditioning unit. In embodiments each of these has a dc-to-ac input converter comprising one or more power switching devices driving one or more input windings of the transformer. Each of these dc-to-dc converters also comprises a coupling/isolation transformer. Optionally the two (or more) dc-to-dc converters may each have a rectifying circuit (comprising one or more rectifiers) following the transformer, or they may share a common rectifying circuit or circuits.

In embodiments each of these power switching devices may free-run, but preferably switching of these devices is synchronised, in particular to reduce ripple on the dc input capacitor(s) and hence smooth the overall load on the dc input. In principle operating the switching devices of the two converters 180° out of phase will reduce the ripple on the input capacitor by a factor of 4. For example this is possible if, in effect, switching devices of the input side dc-to-dc converter and those of the output side dc-to-ac converter are separate and do not need to be synchronised. However in embodiments the input and output rectifiers are synchronised, in which case it can be preferable to operate the switching devices of the input dc-to-ac converters 90° out of phase with one another (as between the two converters), which achieves a factor of 2 reduction in ripple on the input capacitance.

In some particularly preferred embodiments a dc conversion stage controller is provided to control operation of one or both of the dc-to-dc converters, in particular in response to the sensed input or output power. In this way the efficiency of the power conditioning unit can be optimised taking into account both $I^2R$ losses and core losses in the transformers. The transformer core loss is typically substantially constant, fixed by the applied volt seconds that is by the voltage and frequency. Thus at low power levels switching one converter off can reduce this fixed component of loss (typically perhaps of order 1-10 Watts), and at larger powers running both converters to reduce the $I^2R$ losses. In embodiments the controller is configured to switch off one dc-to-dc converter if, when doing so, the overall losses would be substantially the same or reduced.

In preferred embodiments the dc conversion stage controller is configured to provide a 'soft' switching of a dc-to-dc converter so that stored energy in the transformer of the converter has time to dissipate gradually rather than stressing the circuit components. This may be achieved, for example, by gradually changing the frequency of operation of a converter to move the frequency off resonance and/or by gradually reducing the duty cycle of a PWM (pulse with modulation) switching control waveform to increase the switching device off time.

In principle, sensing the power available from the PV panel could be performed using a series resistor, but this would incur losses. In embodiments, therefore, an analogue of the actually available power is measured, in particular by measuring a level of ripple (at the resonant frequency) on a capacitor of an input dc-to-ac converter (more particularly a capacitor in series with one of the power switching devices). With such an arrangement, less ripple indicates less available power and vice versa.

In embodiments each of the dc-to-dc converters is substantially matched to the other, although this is not essential. For example, one converter could have a high power rating, the other a lower power rating in order to skew the efficiency curve towards the high or low power output end. In practice the determination of a threshold at which to switch operation from just a single converter to a pair of converters is best determined by experiment, for example plotting efficiency curves for the one-converter and two-converter modes to determine where the optimum changeover point is located. The skilled person will recognise that a range of different variations of converter circuits may be employed, using full bridge or half bridge rectifier configurations, synchronous rectifiers or diodes, and so forth. Thus whilst in some preferred embodiments the first and second rectifiers comprise synchronous rectifiers, in particular MOSFETs, in other embodiments the first and second rectifiers may simply each comprise a diode; and alternatively the rectifiers may comprise a more complex rectifier circuit.

In a related aspect the invention provides a photovoltaic power conditioning unit for delivering power from a dc power source to an ac mains power supply output, the photovoltaic power conditioning unit comprising: a dc power input to receive dc power from a photovoltaic power source; an ac power output for delivering ac power to said ac mains power supply; a dc link coupled between said dc power input and said ac power output; a dc-to-ac converter coupled between said dc link and said ac power output; first and second dc-to-dc power converters, each coupled between said dc power input and said dc link and each having a series inductor in a connection between a said dc-to-dc power converter and said dc link; and a dc conversion stage controller, coupled to sense an input or output power of said power conditioning unit and to control said first and second dc-to-dc converters; and wherein said dc conversion stage controller is configured to control, responsive to said sensed power, whether one or both of said dc-to-dc converters operates to feed dc power from said dc input to said dc link.

As described above, use of the series inductor helps to equalise current sharing between the first and second dc-to-dc power converters. The dc link will typically comprise a positive and negative (or ground) roll and a series inductor may be included in series with either or both of a power supply connection and a return connection between the dc link and a dc-to-dc power converter. As previously mentioned, in some particularly preferred embodiments the series inductor is implemented as a winding on a transformer of the dc-to-dc converter, in particular connected to a tap on the output winding of the transformer. Again as previously described, preferably the controller is configured to implement 'soft' switching of a converter to reduce component stresses; and again in embodiments the operation of switching devices in the converters is interleaved, preferably at 90° or 180° phase difference between the two converters.

In a further related aspect the invention provides a method of operating a power conditioning unit, the method comprising: converting dc power from a dc power source to dc power for a dc link of said power conditioning unit using a pair of dc-to-dc power converters by converting said dc power to ac, providing said ac to a transformer and converting ac from said transformer to dc for said dc link: converting dc power from said dc link to ac output power; coupling dc outputs of said dc-to-dc power converters via one or more inductors to force load current sharing between said dc-to-dc power converters; sensing a power level into or out of said power conditioning unit; and inhibiting operation of a said dc-to-dc power converter responsive to said sensed power level to reduce losses in a core of said transformer of said dc-to-dc power converter below a threshold power level, and above said threshold power level reducing losses due to resistive heating in a said dc-to-dc power converter by enabling operation of both said dc-to-dc power converters.

Preferably the inductor is built into a transformer of the dc-to-dc power converter.

The invention further provides a power conditioning unit comprising means for performing the steps of the above described method.

BRIEF DESCRIPTION OF THE DRAWINGS

These and other aspects of the invention will now be further described, by way of example only, with reference to the accompanying figures in which:

FIGS. 6a to 6d show, respectively, a power conditioning circuit comprising multiple parallel boost/isolation stages according to embodiment of an aspect of the invention, a more detailed circuit diagram for portion of the power conditioning unit of FIG. 6a, a power conditioning unit including multiple parallel boost/isolation stages each comprising a transformer with an integrated output inductor according to an embodiment of the invention, and waveforms illustrating examples of switching phase offset in a power conditioning unit comprising parallel boost/isolation stages using an LLC conversion topology.

DETAILED DESCRIPTION OF PREFERRED EMBODIMENTS

Power Conditioning Units

Figure 1:
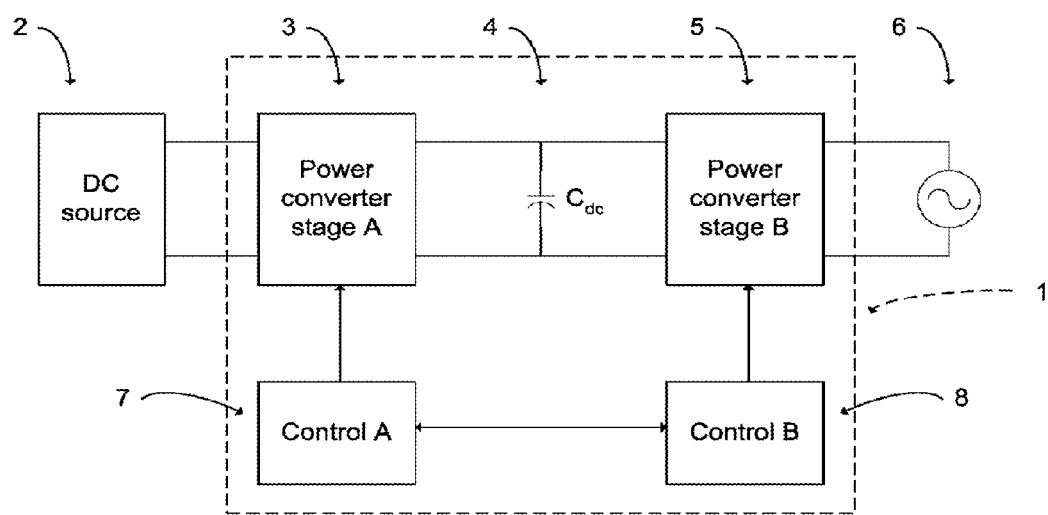
FIG. 1 shows an outline block diagram of an example power conditioning unit.

By way of background, helpful for understanding the operation of embodiments of the invention, we first describe an example photovoltaic power conditioning unit. Thus FIG. 1 shows photovoltaic power conditioning unit of the type we described in WO2007/080429. The power converter 1 is made of three major elements: a power converter stage A, 3, a reservoir (dc link) capacitor $C_{dc}$ 4, and a power converter stage B, 5. The apparatus has an input connected to a direct current (dc) power source 2, such as a solar or photovoltaic panel array (which may comprise one or more dc sources connected in series and/or in parallel). The apparatus also has an output to the grid main electricity supply 6 so that the energy extracted from the dc source is transferred into the supply.

The power converter stage A may be, for example, a step-down converter, a step-up converter, or it may both amplify and attenuate the input voltage. In addition, it generally provides electrical isolation by means of a transformer or a coupled inductor. In general the electrical conditioning of the input voltage should be such that the voltage across the dc link capacitor $C_{dc}$ is always higher than the grid voltage. In general this block contains one or more transistors, inductors, and capacitors. The transistor(s) may be driven by a pulse width modulation (PWM) generator. The PWM signal(s) have variable duty cycle, that is, the ON time is variable with respect to the period of the signal. This variation of the duty cycle effectively controls the amount of power transferred across the power converter stage A.

The power converter stage B injects current into the electricity supply and the topology of this stage generally utilises some means to control the current flowing from the capacitor $C_{dc}$ into the mains. The circuit topology may be either a voltage source inverter or a current source inverter.

Figure 2A:
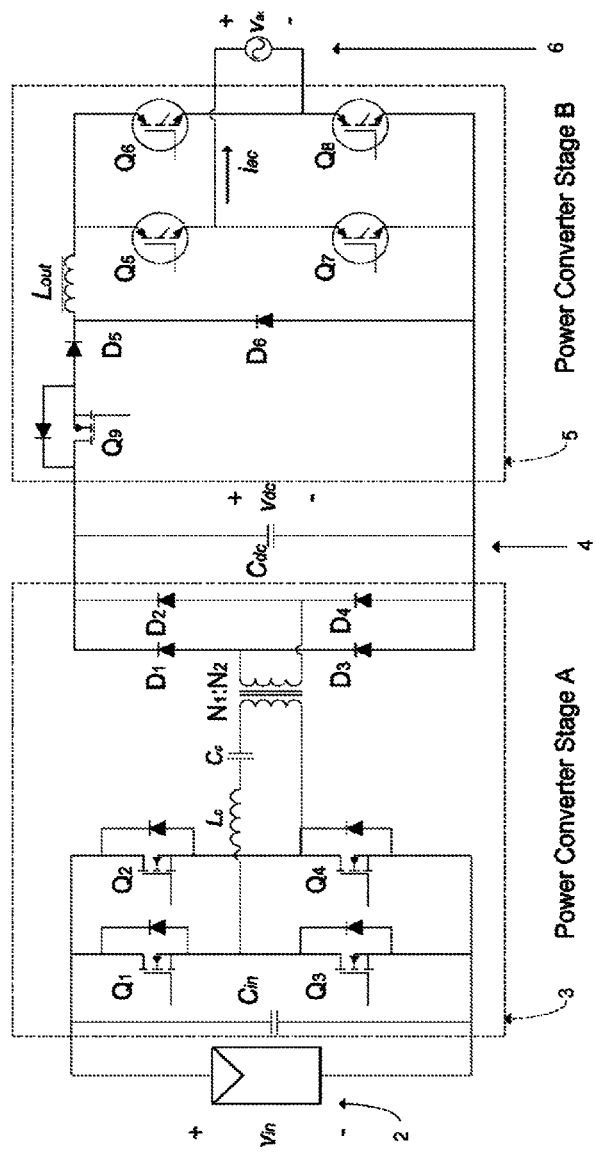
FIGS. 2a and 2b show details of a power conditioning unit of the type shown in FIG. 1.

FIG. 2 shows details of an example of a power conditioning unit of the type shown in FIG. 1; like elements are indicated by like reference numerals. In FIG. 2a Q1-Q4, D1-D4 and the transformer form a dc-to-dc conversion stage, here a voltage amplifier. In alternative arrangements only two transistors may be used; and/or a centre-tapped transformer with two back-to-back diodes may be used as the bridge circuit. In the dc-to-ac converter stage, Q9, D5, D6 and Lout perform current shaping. In alternative arrangements Lout may be located in a connection between the bridge circuit and the dc link capacitor. Transistors Q5-Q8 constitute an "unfolding" stage. Thus these transistors Q5-Q8 form a full-bridge that switches at line frequency using an analogue circuit synchronised with the grid voltage. Transistors Q5 and Q8 are on during the positive half cycle of the grid voltage and Q6 and Q7 are on during the negative half cycle of the grid voltage.

Control (block) A of FIG. 1 may be connected to the control connections (e.g. gates or bases) of transistors in power converter stage A to control the transfer of power from the dc energy source. The input of this stage is connected to the dc energy source and the output of this stage is connected to the dc link capacitor. This capacitor stores energy from the dc energy source for delivery to the mains supply. Control (block) A may be configured to draw such that the unit draws substantially constant power from the dc energy source regardless of the dc link voltage $V_{dc}$ on $C_{dc}$.

Control (block) B may be connected to the control connections of transistors in the power converter stage B to control the transfer of power to the mains supply. The input of this stage is connected to the dc link capacitor and the output of this stage is connected to the mains supply. Control B may be configured to inject a substantially sinusoidal current into the mains supply regardless of the dc link voltage $V_{dc}$ on $C_{dc}$.

The capacitor $C_{dc}$ acts as an energy buffer from the input to the output. Energy is supplied into the capacitor via the power stage A at the same time that energy is extracted from the capacitor via the power stage B. The system provides a control method that balances the average energy transfer and allows a voltage fluctuation, resulting from the injection of ac power into the mains, superimposed onto the average dc voltage of the capacitor $C_{dc}$. The frequency of the oscillation can be either 100 Hz or 120 Hz depending on the line voltage frequency (50 Hz or 60 Hz respectively).

Figure 2B:
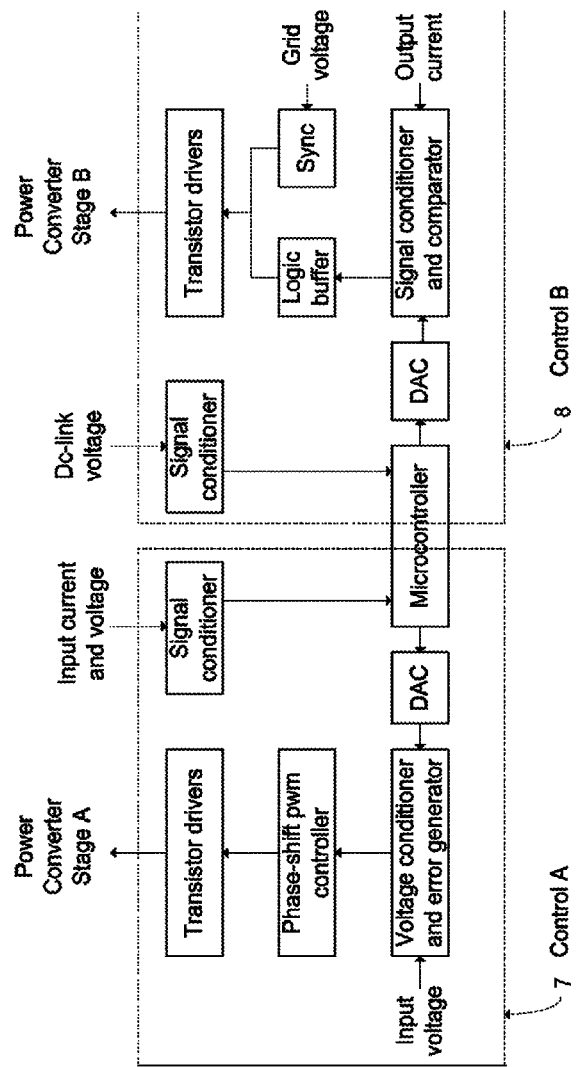

Two control blocks control the system: control block A controls the power stage A, and control block B power stage B. An example implementation of control blocks A and B is shown in FIG. 2b. In this example these blocks operate independently but share a common microcontroller for simplicity.

In broad terms, control block A senses the dc input voltage (and/or current) and provides a PWM waveform to control the transistors of power stage A to control the power transferred across this power stage. Control block B senses the output current (and voltage) and controls the transistors of power stage B to control the power transferred to the mains. Many different control strategies are possible. For example details of one preferred strategy reference may be made to our earlier filed WO2007/080429 (which senses the (ripple) voltage on the dc link)—but the embodiments of the invention we describe later do not rely on use of any particular control strategy.

In a photovoltaic power conditioning unit the microcontroller of FIG. 2b will generally implement an algorithm for some form of maximum power point tracking. In embodiments of the invention we describe later this or a similar microcontroller may be further configured to control whether one or both of the dc-to-dc power converter stages are operational, and to implement "soft" switching off of one of these stages when required. The microcontroller and/or associated hardware may also be configured to interleave the power transistor switching, preferable to reduce ripple as previously mentioned.

Figure 3A:
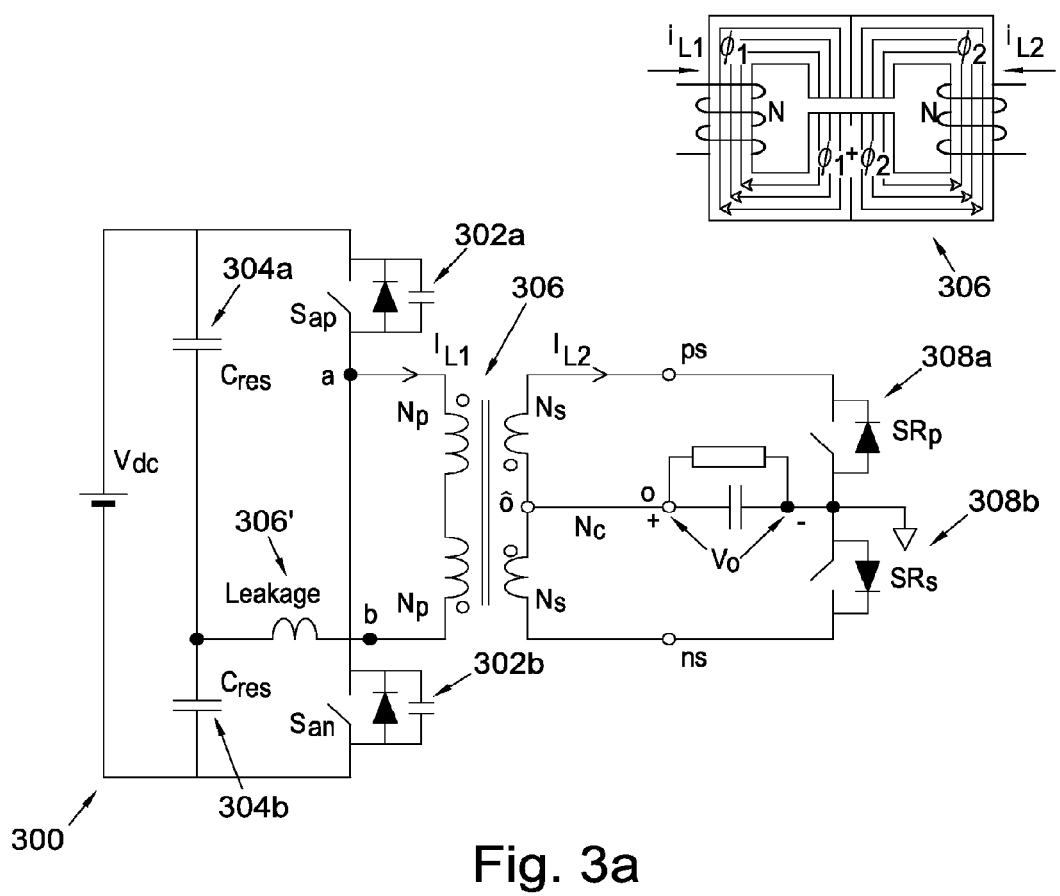
FIGS. 3a to 3c show, respectively, an LLC resonant power converter, waveforms illustrating the operation of the circuit, and an LLC resonant converter incorporating an integrated output inductor according to an embodiment of the invention.

FIG. 3a shows an alternative configuration which may be employed for the power converter stage A in FIG. 2a, using a half-bridge LLC resonant circuit 300. This LLC resonant converter comprises a care of primary side MOSFET switches 302a, b (rather than the four MOSFETs of FIG. 2a) and two resonant capacitors 304a, b. The transformer 306 has a centre-tapped secondary winding coupled to a half-bridge circuit comprising a pair of synchronous rectifier MOSFETs 308a, b (rather than the full bridge of FIG. 2a). The Figure also shows the body diodes and relevant parasitic capacitance of the MOSFET switches.

An example configuration of transformer 306 is shown in the inset diagram, as illustrated comprising a magnetic core including a gap for increased reluctance/energy storage. The leakage inductance of transformer 306 is shown explicitly in FIG. 3a as leakage inductance 306'. The leakage inductance is shown on the primary side of the transformer but the skilled person will appreciate that, using an equivalent representation, this leakage inductance might also be represented on the secondary side of the circuit.

The circuit of FIG. 3a has two resonant frequencies: the resonant frequency is proportional to the inverse square root of the product of the inductance and capacitance. Thus a first, higher resonant frequency is determined by the product of the resonant capacitance 304 and the leakage inductance 306', and the second, lower resonant frequency is determined by the product of the resonant capacitance and the sum of the leakage inductance and the magnetising inductance of the transformer 306. In operation the switches 302 may be operated in a zero voltage switching condition, and the rectifiers 308 in a zero current switching condition. The circuit of FIG. 3 can be operated at a relatively high switching frequency, for a compact, high efficiency circuit.

Figure 3B:
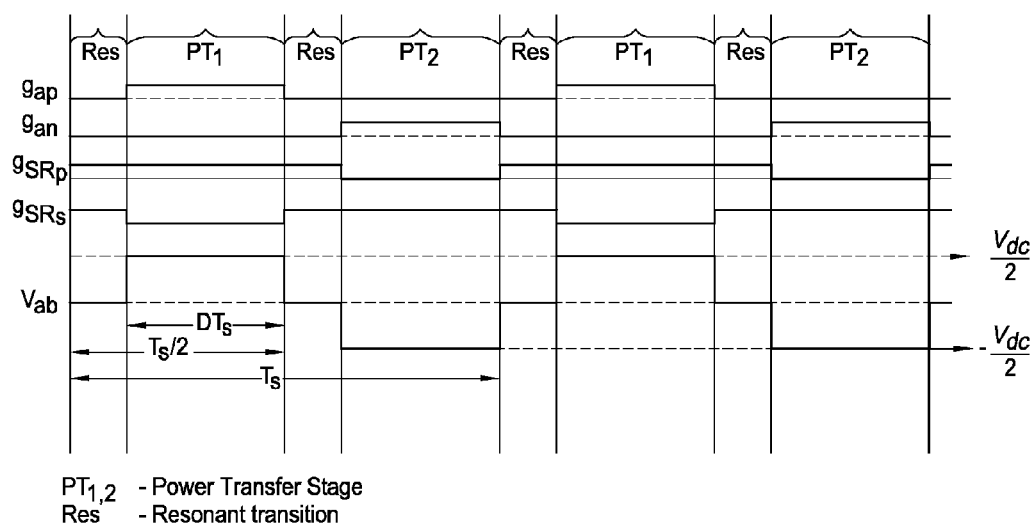

FIG. 3b shows example waveforms illustrating operation of the circuit of FIG. 3a. In FIG. 3b signals $g_{ap}$ and $g_{an}$ are date on control signals for MOSFETs 302a, b and $g_{SRp}$ and $g_{SRs}$ are gate on control signals for synchronous rectifiers 308a, b. Voltage $v_{ab}$ illustrates the voltage across nodes a and b of FIG. 3a and, as can be seen, is a substantially rectangular waveform. By contrast the current through switches 302a, b is substantially sinusoidal (a half sinusoid wave for each 'on' portion of $v_{ab}$). In FIG. 3b the switches 302a, b are switched on alternately to define respective power transfer stages, with some (resonant transition) dead time in between (because synchronous rectification is employed). In an LLC circuit of the type shown in FIG. 3a, for our applications we prefer to have the inductance rather than the capacitance dominating the resonance.

Improved Techniques

The circuit of FIG. 3a may incorporate an additional pair of output inductors (not shown), each connected in series between a respective node ps, ns and a corresponding synchronous rectifier 308a,b. As described later, this is useful in a system comprising two front end power converter stages, to force sharing between these stages at the load. Additionally or alternatively such output inductance may be connected between the rectifier stage and dc link stage of the inverter. However this has drawbacks, including additional losses.

Figure 3C:
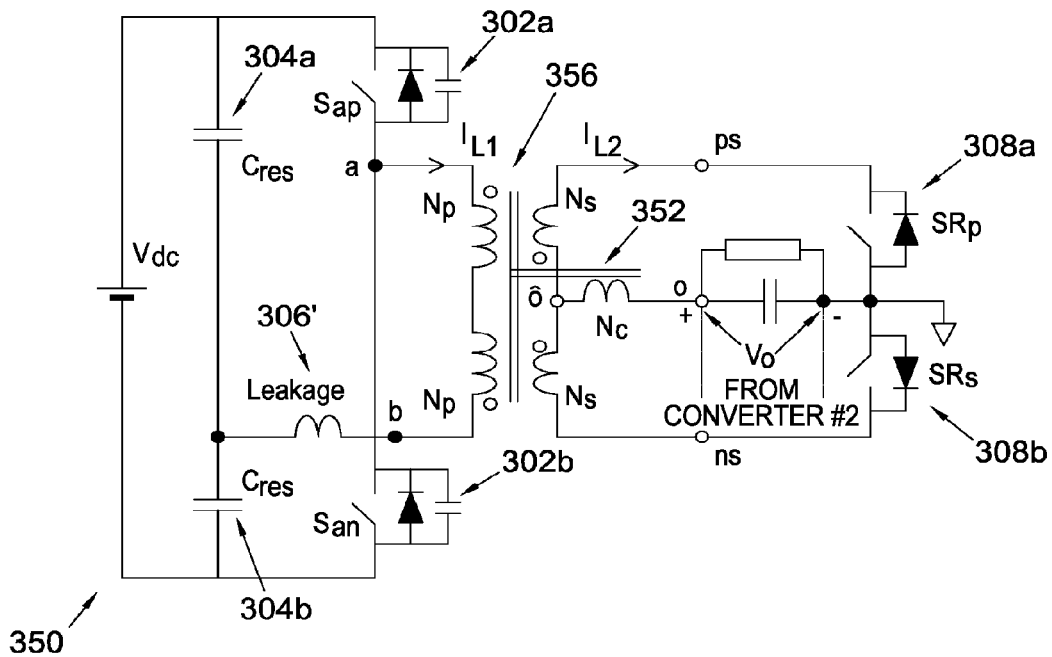
Figure 3C:
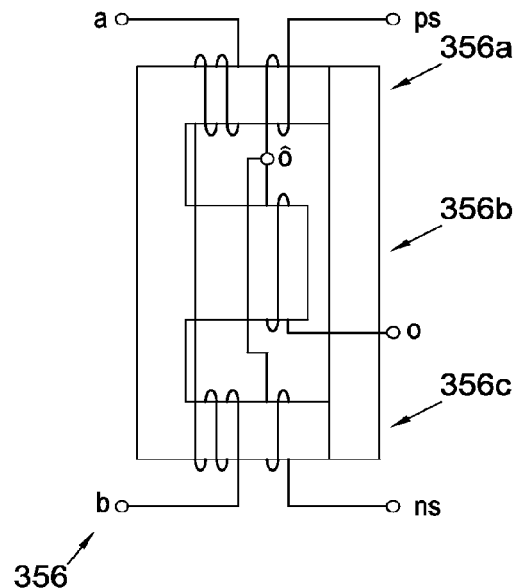

Referring now to FIG. 3c, in which like elements to those previously described are indicated by like reference numerals, this illustrates an embodiment of a switching power converter stage 350 according to an aspect of the invention. The switching power converter uses an LLC converter but the techniques we describe may also be employed in the context of other switching power converter circuits.

In FIG. 3c, the circuit is provided with an output inductor, to facilitate operation of a solar photovoltaic converter employing two parallel power conversion stages connected to a common dc link, but an output inductor 352 is integrated into coupling transformer 356. The inset in FIG. 3c illustrates one preferred arrangement of transformer 356 showing how this output inductance is incorporated into the transformer. Thus in the illustrated example transformer 356 comprises 3 portions or 'legs' 356a, b, c, the magnetic circuit of the transformer being arranged so that the central leg 356b shares flux from both the outer legs 356a, c. One of the primary windings is wound on leg 356a, the other on leg 356c, and the output inductor winding 352 is wound on the central leg or portion 356b. Further, a portion of the winding of inductor 352 is wound on each of legs 356a, c in an opposite sense to that of the primary windings, so that the flux from these windings cancels. In this way the winding on the central legs 356b of inductor 352 experiences a dc flux, and thus functions as a series-connected output inductance carrying (dc) secondary-side current.

As described in more detail later, in a power conditioning unit the dc output of the converter of FIG. 3c ($V_o$) may be provided to the dc link of the power conditioning unit. The skilled person will recognise that the output dc-to-ac converter stage may be implemented in any convenient manner. In preferred embodiments two switching power converter stages, each with a transformer, integrated output inductance, in embodiments each implemented as an LLC resonant converter, are connected in parallel at the dc link. The dashed lines in FIG. 3c illustrate, schematically, where in the circuit of FIG. 3c the dc output of such a second converter would be connected.

Figure 4:
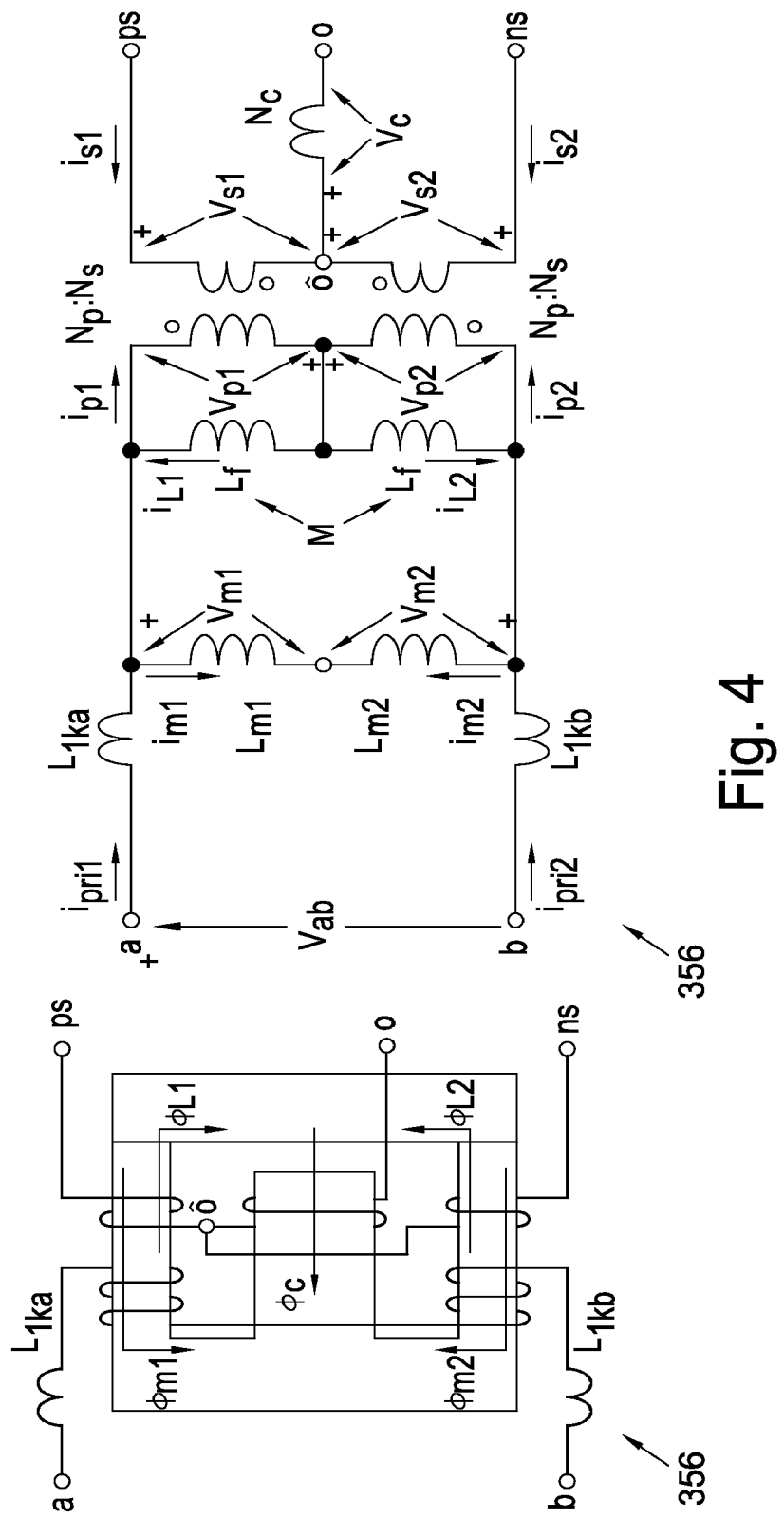
FIG. 4 shows a model and equivalent circuit for the transformer of FIG. 3c incorporating an additional integrated inductor.

Referring next to FIG. 4, this shows transformer 356 of FIG. 3c, and the corresponding equivalent circuit model, explicitly showing leakage inductances, and defining variables used in the design equations below.

Broadly speaking, the value of the output inductance when integrated into transformer 356 can be broadly the same as when a separate output inductor is employed (although parasitic leakage inductance may have a second order effect, changing the resonant frequency of the switching power converter circuit). Broadly speaking the value of the output inductance relates to the power rating of the inverter, and should also support the desired output current. For example in a 'microinverter' with an output power in the range <500 Watts to 1000 Watts the output inductor of each of a pair of front end inverter switching converter circuits may be of order 200 µH.

Broadly speaking, when designing the transformer for a particular power conditioning unit, a useful starting point is the primary side volt-seconds. These are determined by the electronic design (dc operating voltage and switching frequency), and the desired output inductance. The volt-seconds in turn allow the centre leg flux to be determined (noting that the ampere-turns in the centre leg are twice those in the outer legs, because half the flux goes each way). The centre leg flux then allows the effective area of the core and, more particularly, the core material and dimensions, to be determined.

Referring to FIG. 4, and the equations below, m denotes mutual (inductance), lk denotes leakage, p denotes primary, s denotes secondary, c denotes centre, 1 denotes the first primary side winding, 2 denotes the second primary side winding, N denotes the number of turns, and i denotes current.

Using this notation, the magnetizing flux is given by:

$$v_{m1,2} = N_p \frac{d\phi_{m1,2}}{dt}$$

The inductive flux is given by:

$$v_{p1,2} = N_p \frac{d\phi_{L1,2}}{dt}$$

And thus:

$$\phi_{1,2} = \phi_{L1,2} - \phi_{m1,2}$$

And the centre leg flux, is:

$$\phi_C = \phi_1 + \phi_2$$

and $$v_c = N_c \frac{d\phi_C}{dt}$$

For an ideal transformer:

$$\frac{N_p}{N_s} v_{s1,2} = v_{p1,2}$$

$$\frac{N_p}{N_s} i_{p1,2} = i_{s1,2}$$

The magnetizing currents are:

$$i_{m1} = -i_{m2}$$

And the primary currents are:

$$i_{pri1,2} = i_{p1,2} + i_{m1,2}$$

$$i_{pri1} = -i_{pri2}$$

Figure 5A:
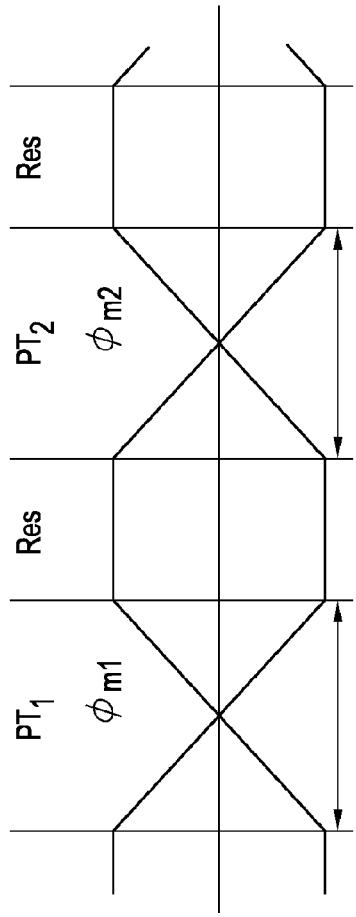
FIGS. 5a to 5c show, respectively, changes in flux due to current through the first and second primary windings of the transformer of FIG. 4, primary side transformer circuits illustrating voltages and currents during alternate power transfer stages and a resonant transition dead time, and corresponding circuits including a secondary side circuit with an additional output inductance.

Now referring to FIG. 5a, this shows flux in the core due to primary windings 1 and 2 during respective power transfer phases of the converter, from which it can be seen that:

$$\Phi_{m1} + \Phi_{m2} = 0$$

$$\Phi_{L1} + \Phi_{L2} = \Phi_C$$

Figure 5B:
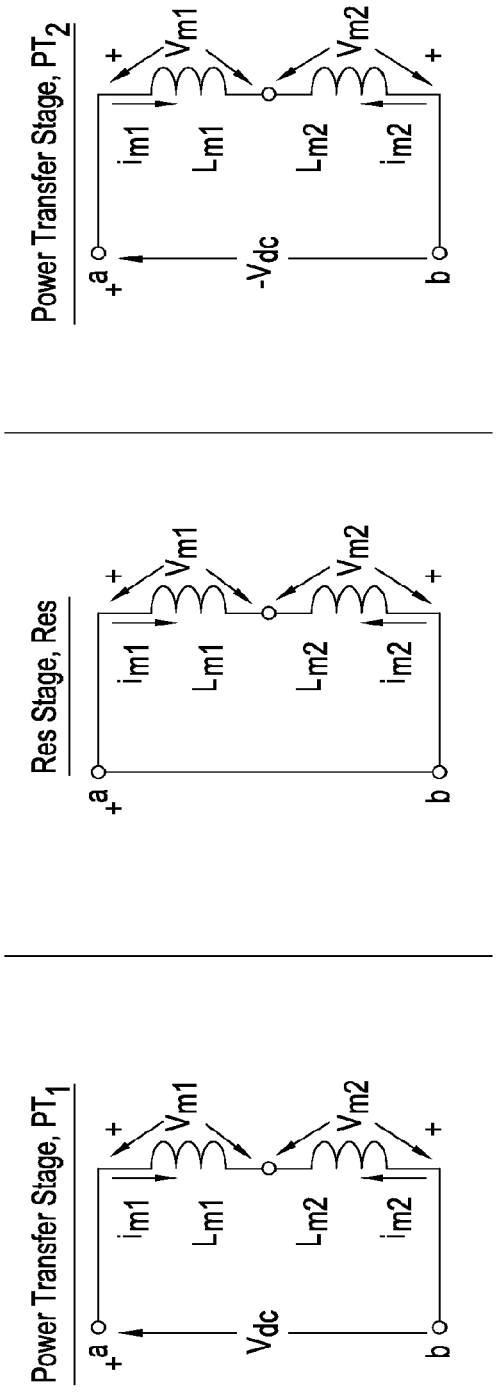

FIG. 5b shows the transformer without the effect of the additional output inductance on the secondary side, and the following equations apply: From FIG. 5b, during the first power transfer stage, $$v_{m1} = N_p \frac{d\phi_{m1}}{dt} = \frac{V_{dc}}{2}$$

$$v_{m2} = N_p \frac{d\phi_{m2}}{dt} = -\frac{V_{dc}}{2}$$

From FIG. 5b, during the "resonant transition" stage:

$$v_{m1} = N_p \frac{d\phi_{m1}}{dt} = 0$$

$$v_{m2} = N_p \frac{d\phi_{m2}}{dt} = 0$$

From FIG. 5b, during the second power transfer stage:

$$v_{m1} = N_p \frac{d\phi_{m1}}{dt} = -\frac{V_{dc}}{2}$$

$$v_{m2} = N_p \frac{d\phi_{m2}}{dt} = \frac{V_{dc}}{2}$$

Figure 5C:
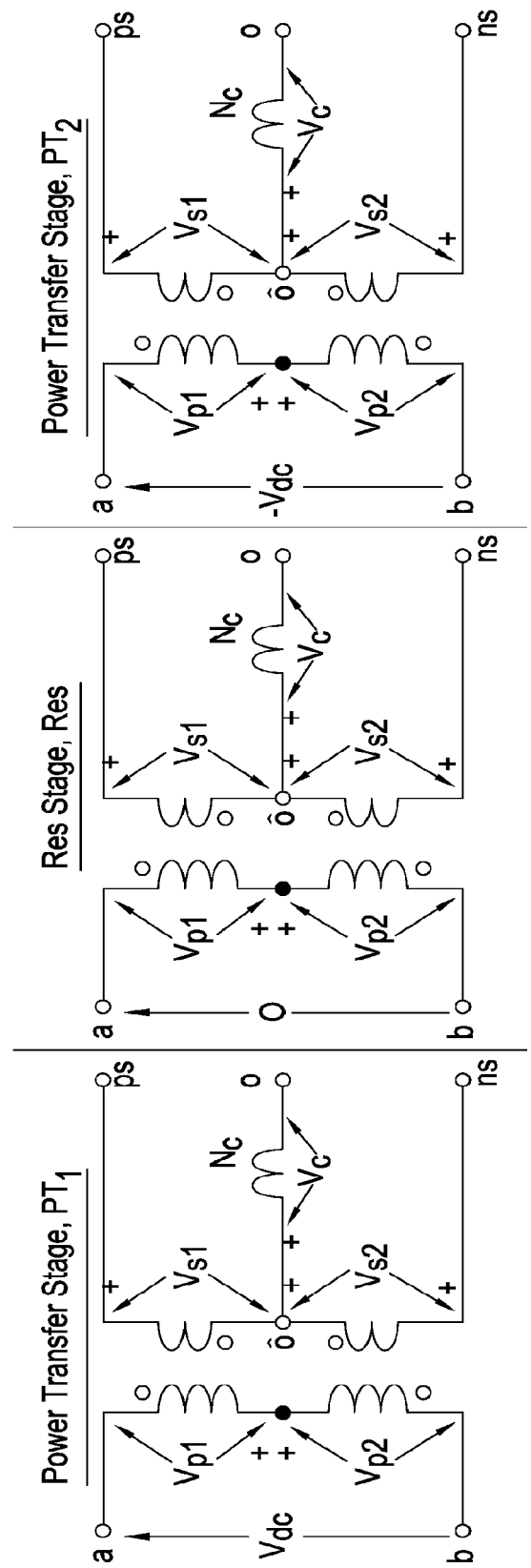

FIG. 5c shows the transformer with the effect of the additional output inductance on the secondary side, and the analysis below indicates how the equations are modified to take this into account. Thus from FIG. 5c, during the first power transfer stage:

$$v_{s1} + v_c = -v_o$$

$$v_{p1} = -\frac{N_p}{N_s}(v_o + v_c)$$

$$v_{p1} + \frac{N_p}{N_s} v_c = -v_o$$

$$v_{p2} + \frac{N_p}{N_s} v_c = V_{dc} - \frac{N_p}{N_s} v_o$$

From FIG. 5c, during the "resonant transition" stage:

$$v_{s2} + v_c = -v_o$$

$$v_{s1} + v_c = -v_o$$

$$v_{p1} = v_{p2} = -\frac{N_p}{N_s}(v_o + v_c)$$

$$v_{p1} + \frac{N_p}{N_s} v_c = -\frac{N_p}{N_s} v_o$$

$$v_{p2} + \frac{N_p}{N_s} v_c = -\frac{N_p}{N_s} v_o$$

And from FIG. 5c, during the second power transfer stage:

$$v_{s2} + v_c = -v_o$$

$$v_{p2} = -\frac{N_p}{N_s}(v_o + v_c)$$

$$v_{p2} + \frac{N_p}{N_s} v_c = -\frac{N_p}{N_s} v_o$$

$$v_{p1} + \frac{N_p}{N_s} v_c = V_{dc} - \frac{N_p}{N_s} v_o$$

We will now describe some preferred embodiments of photovoltaic power conditioning units which employ multiple front end power converter stages connected in parallel between the dc input of the power conditioning unit and the dc link of the power conditioning unit. In embodiments each of these power converter stages implements a boost/isolation stage using an LLC conversion topology. One motivation for this paralleled approach is to mitigate the dc-to-ac conversion losses between the photovoltaic power source (which may be either a string-connected or individual PV module) and the grid. A significant source of such power losses is in the initial boost/isolation stage of such a converter, that is between the dc input and dc link of the power conditioning unit. The losses in this stage relate to both ac losses, and dc losses, for example $I^2R$ losses.

We will now describe techniques to mitigate such losses, in embodiments using phase offset switching of the converter stages to minimise ac ripple current losses as well as dc losses. The techniques we describe enable increased efficiency, as well as reduced component stress and higher reliability. More particularly, in embodiments using such a paralleled resonant/flyback/hard-switched power topology reduces the dc current per converter stage, thus reducing dc losses, and multiphase switching reduces RMS (root mean square) ripple, both reducing aggregate power loss.

In embodiments of the techniques we describe each front end converter stage may operate substantially independently in the sense that it may be separately enabled or disabled, to thereby shape the efficiency curve of the combined system. This is particularly beneficial in a system which is operating at less than 100% of its available power (rating) we will also describe techniques for soft switching of a power converter during enable/disable of a converter, for example by frequency modulation and/or duty cycle modulation.

In embodiments each converter stage is designed to operate at 50% of the maximum load, plus some additional margin to accommodate the accuracy of sharing between stages, including component tolerance and drift over temperature. However in preferred embodiments we use output inductance to in effect force 50/50 sharing between the two power converter stages, which reduces the effects of temperature and component drift and can produce a more efficient and cost effective system. The skilled person will appreciate, however, that 50/50 sharing is not essential.

Figure 6A:
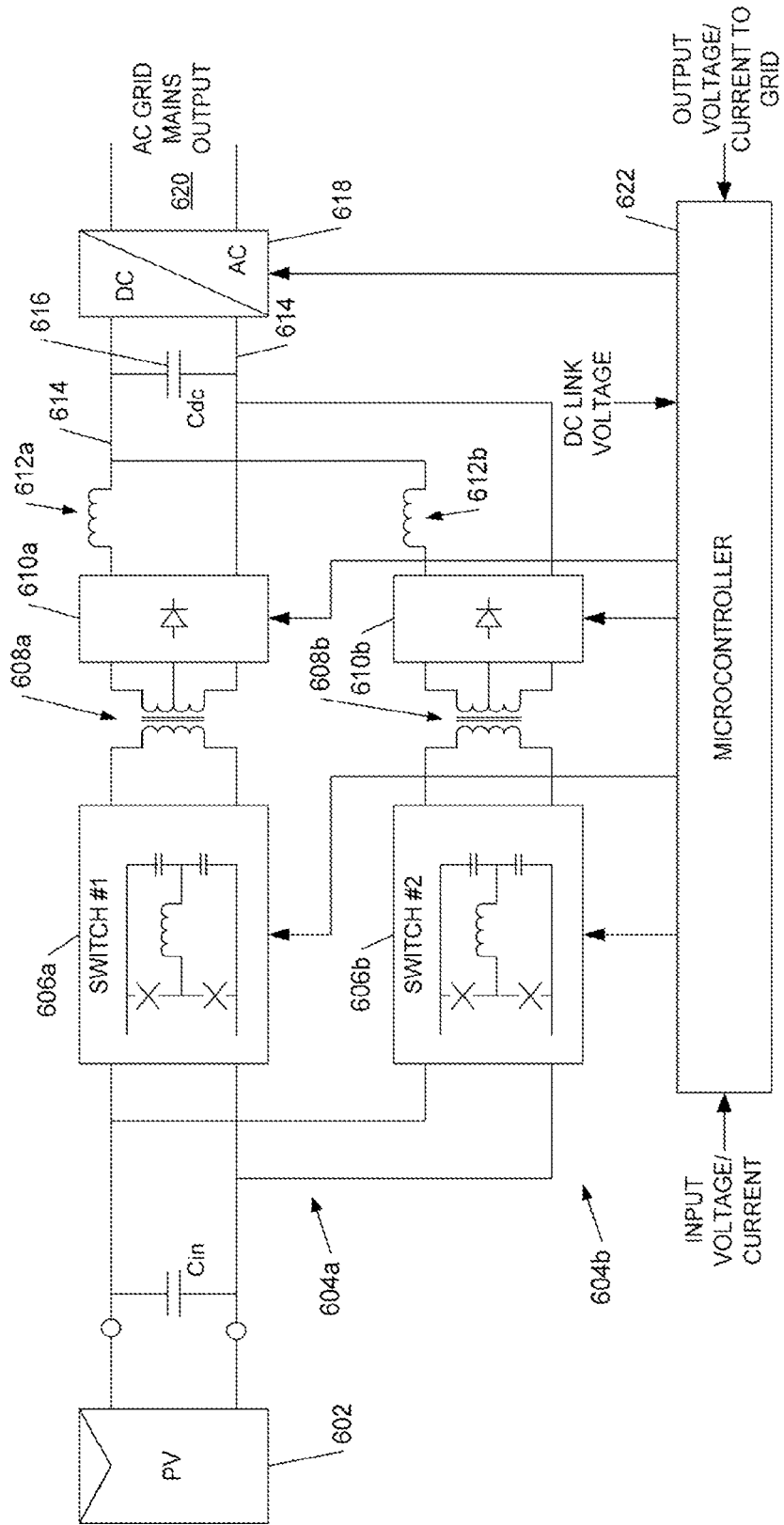

Thus referring now to FIG. 6a, this shows a first embodiment of a power conditioning unit 600 according to an aspect of the invention. In the architecture of FIG. 6 a photovoltaic module 602 provides a dc power source for first and second dc-to-dc power conversion stages 604a, b, in this example each comprising an LLC resonant converter of the type shown in FIG. 3a. Thus each of power conversion stages 604 comprises a dc-to-ac (switching) converter stage 606a, b to convert dc from module 602 to ac for a respective transformer 608a, b. The secondary side of transformers 608a, b are coupled to respective rectifying circuits 610a, b, which in turn provide a dc output to a respective series-coupled output inductor 612a, b. Each of output inductors 612a, b is coupled to a dc link 614 of the power conditioning unit, to which is also coupled a dc link capacitor 616. A dc-to-ac converter 618 has a dc input from a dc link and provides an ac output 620, for example to an ac grid mains supply.

A microcontroller 622 provides switching control signals to dc-to-ac converters 606a, b, to rectifying circuits 610a, b (for synchronous rectifiers), and to dc-to-ac converter 618 in the output 'unfolding' stage. As illustrated microcontroller 622 also senses the output voltage/current to the grid, the input voltage/current from the PV module 602, and, in embodiments, the dc link voltage. In some preferred embodiments the microcontroller 622 implements a control strategy as previously described, although the operation of embodiments of the invention is not tied to any particular control strategy or, for example, to any particular MPPT (maximum power point tracking) strategy.

In the circuit of FIG. 6a the output inductors 612a,b effectively force load sharing between the front end converters 604a,b. Efficiency gains arise because LLC converters are core-loss dominant, so a smaller core enabled by a reduced power rating for each individual converter reduces the overall core losses. Furthermore if the power of each converter falls by a factor of 2, the $I^2R$ losses fall by a factor of 4 (per Watt). This is balanced against additional components, in particular two additional switches, albeit of lower rating.

The techniques we describe are particularly useful for so-called microinverters, for example having a maximum rate of power of less than 1000 Watts and or connected to a small number of PV modules for example just one or two such modules. This is because in such systems the panel voltages can be as low as 20 volts and hence the conversion currents can be in excess of 30 amps RMS.

Figure 6B:
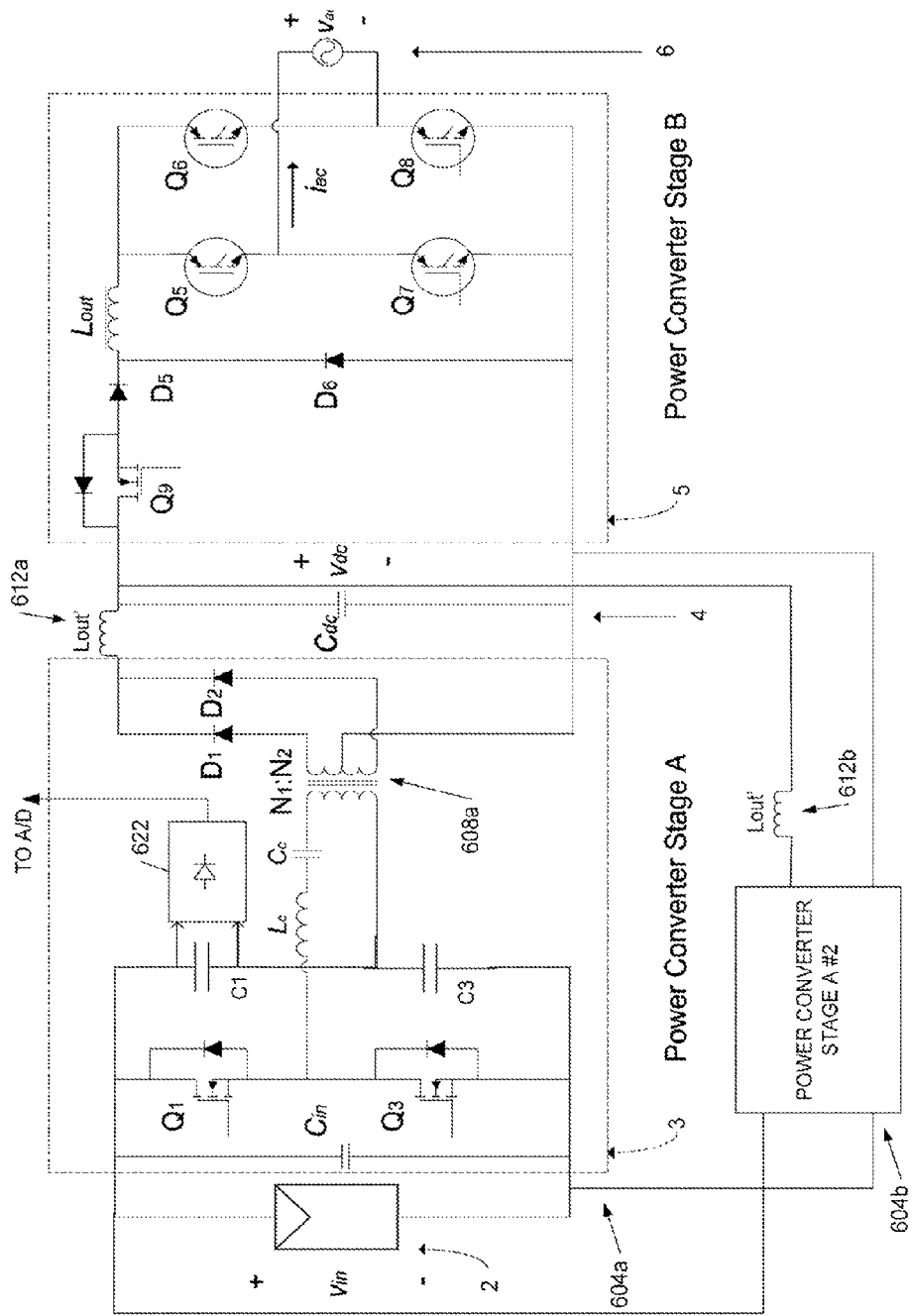

Referring now to FIG. 6b, this shows details of a portion of an example implementation of the arrangement of FIG. 6a. This example arrangement employs a modification of the circuit of FIG. 2a and like elements to those of FIG. 2a are indicated by like reference numerals; likewise like elements to those of FIG. 6a are indicated by like reference numerals. In the arrangement of FIG. 6b an LLC converter is employed (by contrast with FIG. 2a), using a pair of resonant capacitors C1, C3. FIG. 6b illustrates ripple current sensing to sense the available power from the photovoltaic module. As illustrated a circuit 622 rectifies a ripple voltage across one or both of the resonant capacitors and provides an output, for example to an analogue-to-digital converter for interfacing with microcontroller 622. The available power is dependent upon the level of ripple, and the illustrated arrangement provides an efficient way of measuring available power from the panel.

Figure 6C:
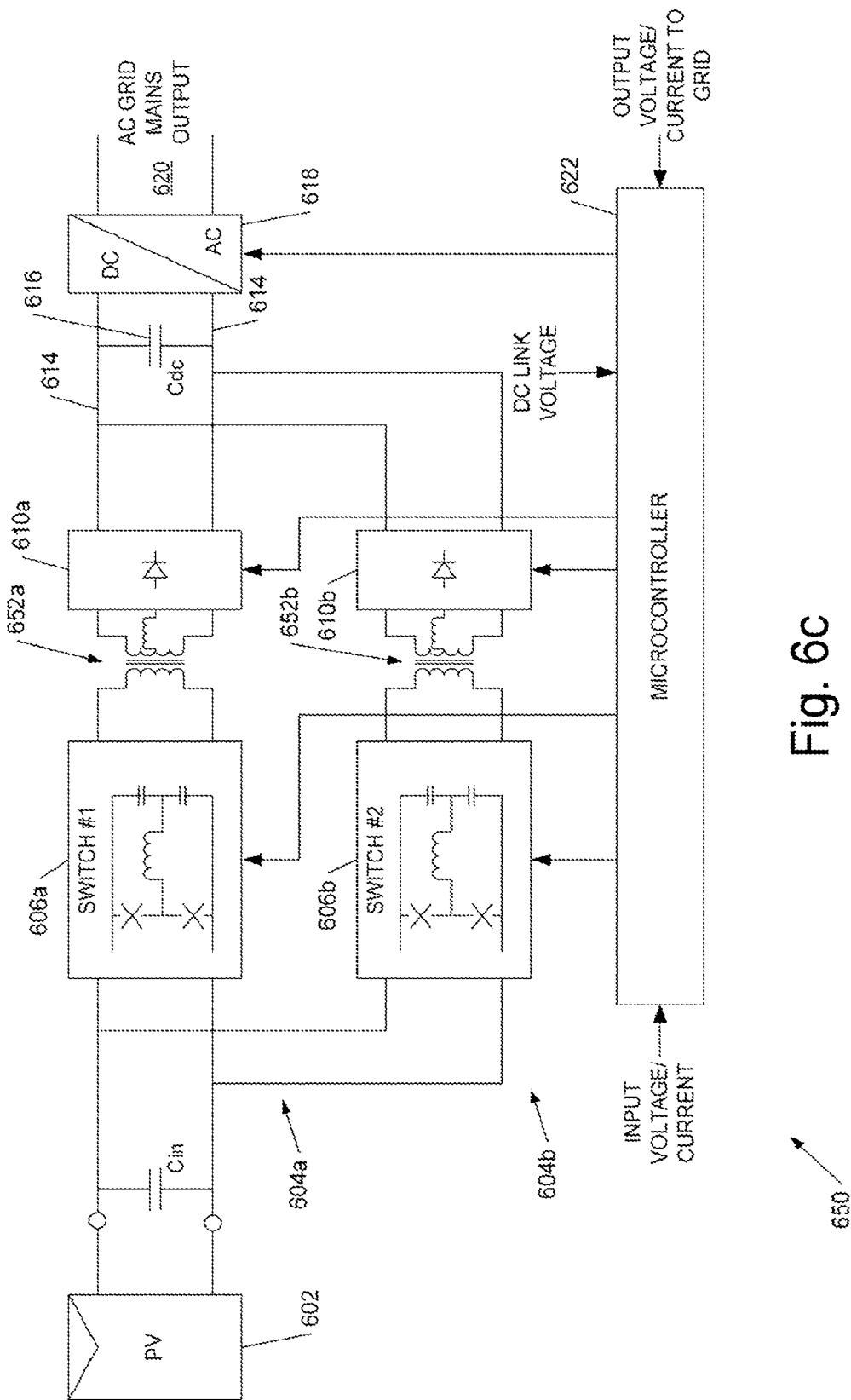

Referring now to FIG. 6c, this shows a second embodiment of the power conditioning unit 650 similar to that of FIG. 6a but with an improved arrangement of output inductors. More particularly the output inductors 612 of the FIG. 6a are incorporated into respective transformers 652a, b of the front end dc-to-dc converter stages, as previously described with reference to FIG. 3c, to obtain the previously mentioned advantages, in particular improved load sharing between the conversion stages.

FIG. 6d illustrates example waveforms of multiphase interleaving of the switching of the converters 604a,b (in the Figure the waveforms illustrate example data control signals of the switches in stages 606a, b of the converters). To reduce ripple on the input capacitor the switching is preferably 180° out of phase between the two converters. However in embodiments the rectification circuits 610a,b of the power converters may be shared (not shown), i.e. so that a common set of rectifiers/rectification circuits is employed for both converters. In this case the interleaving between the dc-to-ac conversion portions of the dc-to-dc converters 604a,b may be interleaved 90° out of phase, as illustrated in FIG. 6d. This provides further efficiencies in circuit simplification, albeit at the expense of increased ripple.

At low input/output powers it is more efficient to run just a single front end converter 604, to reduce core loses in the transformer, but at higher input/output powers it is more efficient to run both converters, to reduce resistive losses. To avoid rapid dumping of the energy stored in a transformer 608 preferably microcontroller 622 is configured to switch a converter on/off gradually, for example either by gradually moving the switching frequency off resonance and/or by gradually reducing the duty cycle of a PWM control signal to the converter switch, to reduce the switch on-time and thus gradually dissipate the stored energy. It will be appreciated that, if desired, such techniques may also be employed to turn a converter partially on or partially off.

The point at which a change-over occurs between running one converter and running both converters is best determined by experiment, for example by plotting curves of efficiency and/or loss when running two converters and when just running a single converter, to determine the change-over point.

Figure 7A:
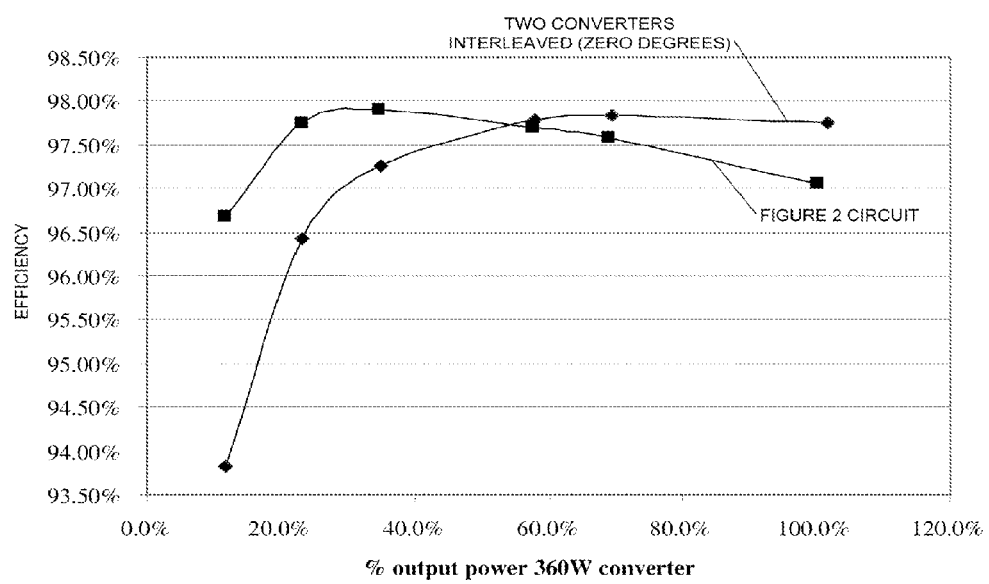
FIGS. 7a and 7b illustrate, respectively, efficiency gains and loss reduction for a power conditioning unit of the general type shown in FIG. 6b.
Figure 7B:
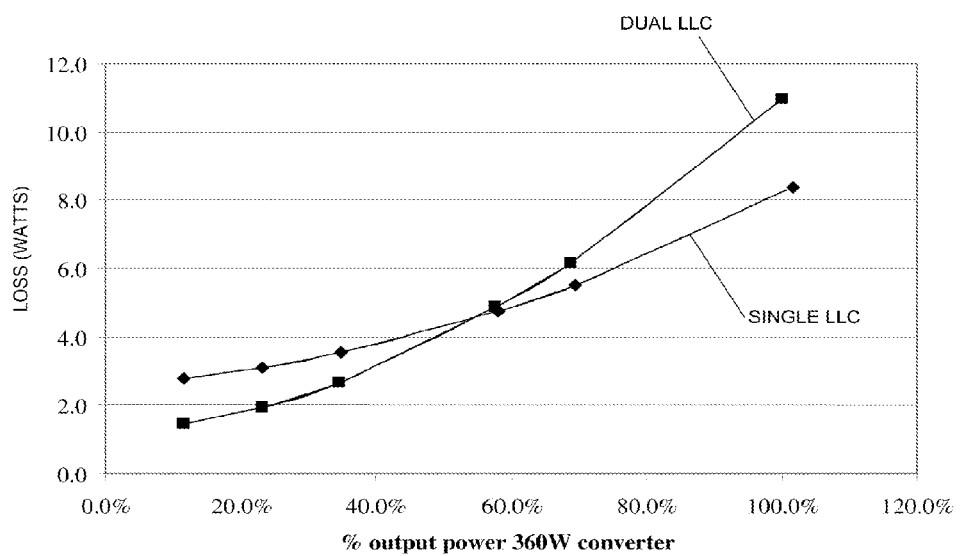

Thus FIGS. 7a and 7b show efficiency, and corresponding loss, for a 360 Watt power conditioning unit with a 35 volt input and dual LLC resonant converter front ends. The curves illustrate the change in efficiency/loss for running one/two converters, showing the change-over point for maximum efficiency in this particular example. The skilled person will appreciate that the precise change-over point will depend upon the particular circuit implementation, and may be measured for any particular power conditioning unit to enable microcontroller 622 to be programmed to control the switching accordingly. In this way the efficiency curve of the power conditioning unit can be shaped to achieve optimum conversion efficiency over the PV power range.

Although this is generally preferable to optimise efficiency, optionally the change-over point may be adjusted away from the maximum efficiency point, for example to take account of external factors and/or to provide some hysteresis in the switching. Optionally the switching point may be biased towards either single or dual converter use (for example in the latter case to reduce overall component stresses and hence potentially prolong lifetime).

We have thus described techniques for potentially maximising solarvoltaic power conditioning unit efficiency over substantially the full PV voltage range, and additionally techniques which enable incorporation of lossy inductor elements into an integrated magnetic component. Embodiments of the transformer we describe are also relatively straightforward to manufacture.

No doubt many other effective alternatives will occur to the skilled person. For example it is potentially possible to omit the input dc-to-dc converter. It will be understood that the invention is not limited to the described embodiments and encompasses modifications apparent to those skilled in the art lying within the spirit and scope of the claims appended hereto.

The invention claimed is:

1. A photovoltaic power conditioning unit for delivering power from a dc power source to an ac mains power supply output, the photovoltaic power conditioning unit comprising:
    a dc power input to receive dc power from a photovoltaic power source;
    an ac power output for delivering ac power to said ac mains power supply;
    a dc link coupled between said dc power input and said ac power output;
    a dc-to-ac converter coupled between said dc link and said ac power output;
    first and second dc-to-dc power converters, each dc-to-dc power converter coupled between said dc power input and said dc link and each dc-to-dc power converter having a series inductor in a connection between said dc-to-dc power converter and said dc link, wherein each dc-to-dc power converter comprises a transformer having an input winding and an output winding, wherein said output winding of said transformer has a winding tap between first and second portions of said output winding, wherein said series inductor comprises an inductor connected to said winding tap, wherein the series inductor is shared by first and second rectifiers for connecting to the first and second portions of said output winding; and
    a dc conversion stage controller, coupled to sense an input or output power of said power conditioning unit and to control said first and second dc-to-dc converters; and
    wherein said dc conversion stage controller is configured to control, responsive to said sensed power, whether one or both of said dc-to-dc converters operates to feed dc power from said dc input to said dc link.

2. The photovoltaic power conditioning unit of claim 1, wherein each of said dc-to-dc converters further comprises:
    an input dc-to-ac converter coupled between said dc power input and said input winding of said transformer; and
    an ac-to-dc converter coupled between said output winding of said transformer and said dc link.

3. The photovoltaic power conditioning unit of claim 2, wherein said series inductor comprises a winding on said transformer.

4. The photovoltaic power conditioning unit of claim 1, wherein said dc conversion stage controller is configured to switch off one of said dc-to-dc converters by gradually reducing said dc power fed to said dc link by the dc-to-dc converter.

5. The photovoltaic power conditioning unit of claim 4, wherein said first and second dc-to-dc converters comprise power switching devices to switch said dc power to said input winding of a respective said transformer; and wherein said dc conversion stage controller is configured to switch off one of said dc-to-dc converters by controlling a duty cycle of a pulse width modulated waveform controlling switching of one of said power switching devices.

6. The photovoltaic power conditioning unit of claim 4, wherein said first and second dc-to-dc converters comprise power switching devices to switch said dc power to said input winding of a respective said transformer; and wherein said dc conversion stage controller is configured to switch off one of said dc-to-dc converters by controlling a switching frequency of one of said power switching devices to gradually move said switching frequency away from a resonant frequency of a respective said dc-to-dc converter.

7. The photovoltaic power conditioning unit of claim 1, wherein said dc conversion stage controller is configured to inhibit operation of one of said dc-to-dc converters responsive to said sensed power being less than a threshold level.

8. A method of operating a power conditioning unit, the method comprising:
    converting dc power from a dc power source to dc power for a dc link of said power conditioning unit using a pair of dc-to-dc power converters by converting said dc power to ac by providing said ac to a transformer in each of said dc-to-dc power converters and converting ac from said transformer to dc for said dc link, wherein said transformer having an input winding and an output winding, wherein said output winding of said transformer has a winding tap between first and second portions of said output winding;
    converting dc power from said dc link to ac output power;
    coupling dc outputs of said dc-to-dc power converters via one or more inductors to force load current sharing between said dc-to-dc power converters, wherein at least one of said inductors is connected to said winding tap of said transformer, wherein said inductor is shared by first and second rectifiers for connecting to the first and second portions of said output winding;
    sensing a power level into or out of said power conditioning unit; and
    inhibiting operation of one of said dc-to-dc power converters responsive to said sensed power level to reduce losses in a core of said transformer of said dc-to-dc power converter below a threshold power level, and above said threshold power level reducing losses due to resistive heating in one of said dc-to-dc power converters by enabling operation of both said dc-to-dc power converters.

9. A method as claimed in claim 8, wherein said at least one inductor connected to said winding tap of said transformer is part of said transformer of the dc-to-dc power converter.

* * * * *